(12) United States Patent
Oka

(10) Patent No.: US 6,590,576 B1
(45) Date of Patent: Jul. 8, 2003

(54) METHOD AND APPARATUS FOR PERFORMING PERSPECTIVE TRANSFORMATION

(75) Inventor: Masaaki Oka, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/546,271

(22) Filed: Apr. 10, 2000

(30) Foreign Application Priority Data

Apr. 9, 1999 (JP) .......................... 11-102655
Jun. 8, 1999 (JP) .......................... 11-161742

(51) Int. Cl.⁷ .............................................. G06T 15/00
(52) U.S. Cl. ...................................................... 345/427
(58) Field of Search ................................ 345/418, 420, 345/422, 427, 419, 421, 423, 426, 501; 395/123, 127, 121, 120, 119, 167; 358/527

(56) References Cited

U.S. PATENT DOCUMENTS 5,283,859 A  *  2/1994  Quarendon et al. ......... 395/127
5,420,979 A  *  5/1995  Madden et al. ............. 395/162
5,561,746 A  * 10/1996  Murata et al. .............. 395/119
5,841,442 A    11/1998  Einkauf et al. ............. 345/430
6,354,944 B1 *  3/2002  Takahashi et al. ........... 463/32

FOREIGN PATENT DOCUMENTS

EP    0 549 944 A2    7/1993
EP    0 642 102 A1    3/1995

* cited by examiner

Primary Examiner—Almis R. Jankus
(74) Attorney, Agent, or Firm—Lerner, David, Littenberg, Krumholz & Mentlik, LLP

(57) ABSTRACT

An apparatus for perspective transformation of an object in three-dimensional space on a virtual two-dimensional screen, the object being specified by a plurality of points, where the apparatus includes a graphics unit operable to determine whether the plurality of points are localized with respect to a point of view in the three-dimensional space, and to use coordinate values of a typical point of the plurality of points in approximating the perspective transformation of the other points.

30 Claims, 9 Drawing Sheets

METHOD AND APPARATUS FOR PERFORMING PERSPECTIVE TRANSFORMATION

BACKGROUND OF THE INVENTION

1. Field of the Invention

The present invention relates to a computer graphic process and, more particularly, to a method and apparatus for perspective-transforming a three-dimensional thing on a virtual two-dimensional screen.

2. Description of the Related Art

In a conventional technique, when a three-dimensional object (thing) is perspective-transformed on a virtual two-dimensional screen, points for specifying the thing are respectively calculated in accordance with ratios of distances between a point of view and the points to a distance between the point of view and the screen to perform perspective transformation.

However, since the distances between the point of view and the respective points for specifying the thing are different from each other, very large amounts of calculation for the distances are required by the CPU (Central Processing Unit) or another device of a computer. In other words, in an entertainment system such as a video game apparatus, the heavy load on the CPU or the like is a problem when high-speed processing for an object image which continuously changes is performed.

SUMMARY OF THE INVENTION

The present invention has been made in consideration of the above problem, relates to a computer graphic process, and has as its object to provide a novel method and apparatus for perspective-transforming a three-dimensional thing on a virtual two-dimensional screen.

An apparatus for perspective-transforming a thing placed in a three-dimensional space according to the present invention has means in which, when the coordinate values of a plurality of points for specifying the thing are localized with respect to a certain direction in the three-dimensional space, by using the coordinate values of a typical point selected from the plurality of points, perspective transformation of the other points is approximated, and calculation for graphics is performed at a high speed.

When a plurality of things are localized in a three-dimensional space, approximation is performed in units of things.

The direction of a line of sight extending from a point of view to the thing is frequently used. For example, this direction of the line of sight is a Z-axis direction in an XYZ coordinate system specified around the point of view.

As the plurality of points, vertex coordinates obtained when a thing is drawn with polygons are frequently used.

The typical point is determined by a replacing method on the basis of the coordinate values of the plurality of points. For example, as the typical point, an average value of Z values, the Z value of the first selected point, or a point selected last can be set.

The coordinate values can also be calculated by a linear approximation, a quadratic approximation, or a higher-order approximation.

In this case, whether the coordinate values of a plurality of points for specifying the thing are localized with respect to a certain direction in the three-dimensional space or not is determined in the following manner. That is, it is assumed that the minimum value of the Z values of the thing in the Z-axis direction is represented by minZ, that the maximum value of the Z values of the thing is represented by maxZ, and that the average value of the Z values of the thing is represented by meanZ. In this case, when expressions:

$$|minZ - maxZ| \div |minZ| \cdot K1,$$

$$|minZ - maxZ| \div |maxZ| \cdot K1, \text{ or}$$

$$|minZ - maxZ| \div |meanZ| \cdot K1$$

are satisfied, it is determined that the Z values of the thing are localized. The value of K1 is, e.g., 0.1.

However, the value of K1 may be changed depending on an application program to be applied, a scene to be applied, and the like.

In addition, whether the coordinate values of the plurality of points for specifying a plurality of things are localized with respect to a certain direction in the three-dimensional space in units of things or not is determined in the following manner. That is, it is assumed that the minimum value of the Z values of the ith thing (i=1, 2, . . . , M) in the Z-axis direction is represented by minZi, that the maximum value of the Z values of the ith thing is represented by maxZi, and that the average value of the Z values of the ith thing is represented by meanZi. In this case, when expressions:

$$|minZ1 - maxZ1| \div |meanZ1 - meanZ2| \cdot K2,$$

$$|minZ2 - maxZ2| \div |meanZ1 - meanZ2| \cdot K2,$$

$$|minZ2 - maxZ2| \div |meanZ2 - meanZ3| \cdot K2,$$

$$|minZ3 - maxZ3| \div |meanZ2 - meanZ3| \cdot K2,$$

$$|minZM-1 - maxZM-1| \div |meanZM-1 - meanZM| \cdot K2, \text{ and}$$

$$|minZM - maxZM| \div |meanZM-1 - meanZM| \cdot K2,$$

are satisfied, it is determined that the Z values are localized in units of things. In this case, approximate calculations are performed in units of things. The value of K2 is, e.g., 0.1.

However, the value of K2 may be changed depending on an application program to be applied, a scene to be applied, and the like. The method may be selectively applied to only a thing in which the expressions are satisfied.

In addition, an apparatus for perspective-transforming a thing placed in a three-dimensional space on a virtual two-dimensional screen has means in which, when the coordinate values of a plurality of points for specifying things on the same scene are localized with respect to a certain direction in units of things, by using the coordinate values of a typical point selected for the respective things, perspective transformation of the other points for specifying the things is approximated.

The typical points may be selected by a replacing method, a linear approximation, a quadratic approximation, or a higher-order approximation.

In addition, an entertainment system according to the present invention including a control system, a graphic system, a sound system, an optical disk control unit, and a bus for connecting these systems and the unit to each other, and wherein the graphic system has a geometry transfer engine, and when the coordinate values of a plurality of points for specifying the thing are localized with respect to a certain direction in the three-dimensional space, by using the coordinate values of a typical point selected from the plurality of points, the graphic system approximates perspective transformation of the other points.

Here, when a plurality of things exist, and when the things are localized in units of things, approximation is performed in units of things.

In addition, a method of perspective-transforming a thing placed in a three-dimensional space according to the present invention includes the steps of: checking whether the coordinate values of a plurality of points for specifying the thing are localized with respect to a certain direction in the three-dimensional space or not; and, if the coordinate values are localized, approximating perspective transformation of the other points by using the coordinate values of a typical point selected from the plurality of points.

Here, when a plurality of things exist, and when the things are localized in units of things, approximation is performed in units of things.

In this manner, when the plurality of points are perspective-transformed, the Z values of several points can be arithmetically operated with approximate values. For this reason, a load on a CPU and other arithmetic operation means is reduced, and a high-speed perspective transformation can be achieved.

DESCRIPTION OF THE PREFERRED EMBODIMENT

An embodiment according to the present invention will be described below in detail with reference to the accompanying drawings.

Entertainment System

First, an entertainment system, according to the present invention, being capable of executing three-dimensional graphics will be described with reference to the drawings.

Figure 1:
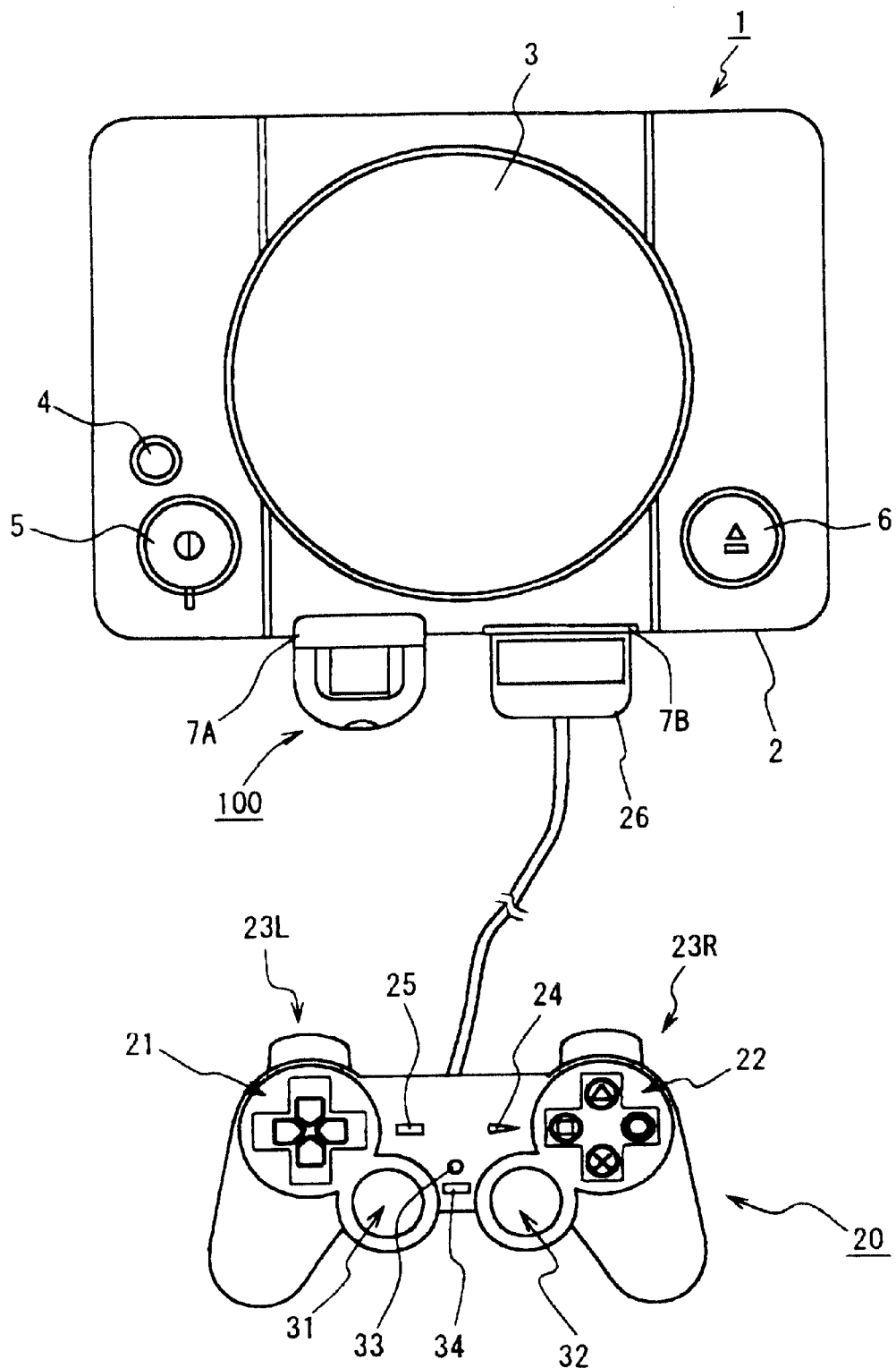
FIG. 1 is a perspective view showing the appearance of a video game apparatus serving as an example of an entertainment system for realizing the present invention.

FIG. 1 shows a video game apparatus as an example of an entertainment system. This video game apparatus 1 reads a game program recorded on, e.g., an optical disk or the like to execute the game program according to an instruction from a user (game player). Execution of the game mainly means the progress of a game and control of a display or sound.

A main body 2 of the video game apparatus 1 comprises a disk loading unit 3 on which an optical disk such as a CD-ROM serving as a recording medium for supplying an application program such as a video game to the central unit is loaded, a reset switch 4 for arbitrarily resetting the game, a power switch 5, a disk operation switch for operating loading of the optical disk, and, e.g., two slot units 7A and 7B.

Two operation devices 20 can be connected to the slot units 7A and 7B, so that two users can perform a match-up game or the like. A memory card device in which game data can be saved (stored) or read or a portable electronic device in which a game can be executed independently of the main body can also be connected to the slot units 7A and 7B.

The operation device (to be referred to as a "controller" hereinafter) 20 has first and second operation units 21 and 22, an L button 23L, an R button 23R, a start button 24, and a selection button 25. The controller further has operation units 31 and 32 which can be analogously operated, a mode selection switch 33 for selecting one of the operation modes of the operation units 31 and 32, and a display unit 34 for displaying a selected operation mode.

Figure 2:
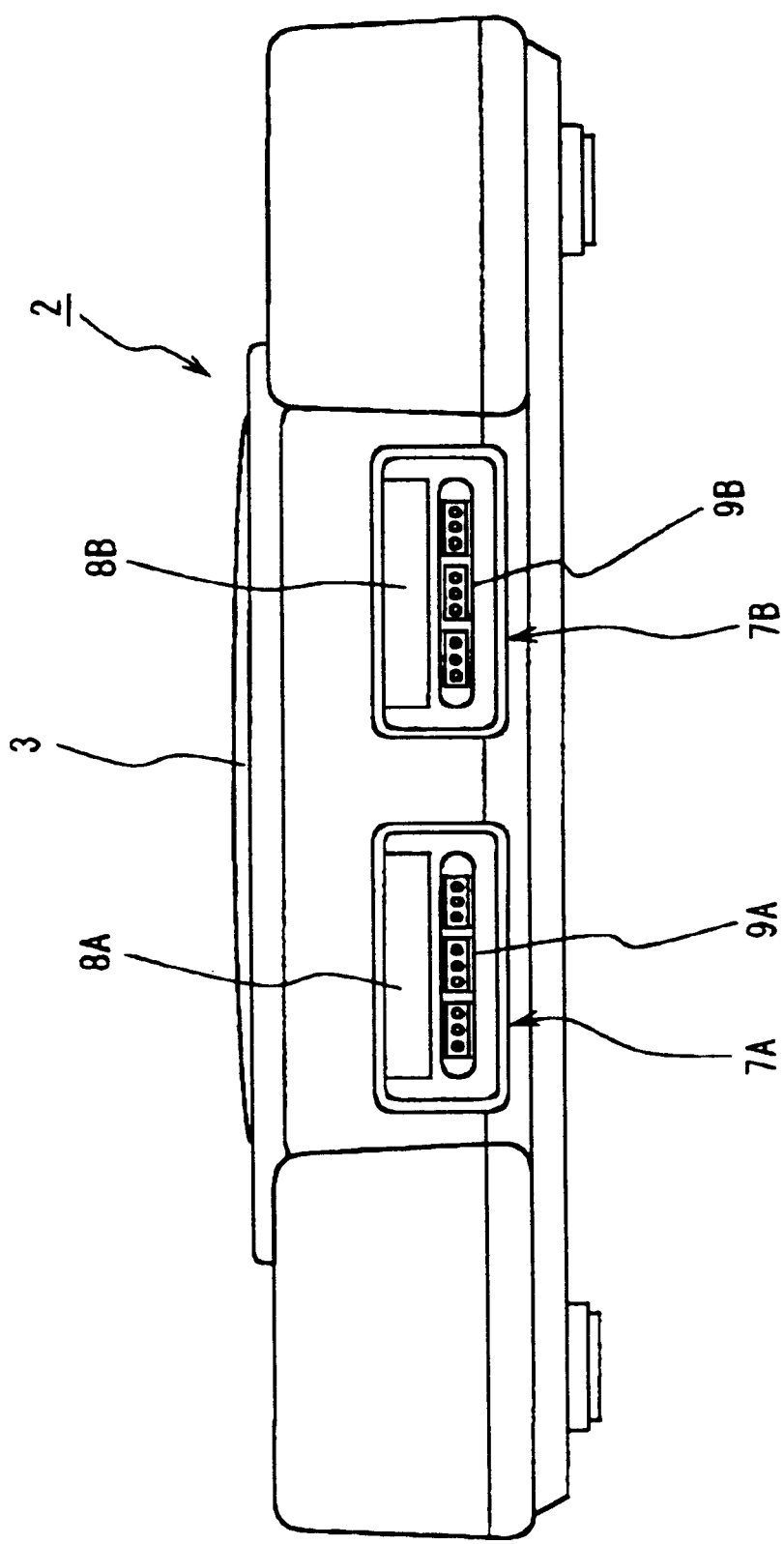
FIG. 2 is a perspective view showing the front surface of the video game apparatus in FIG. 1.

FIG. 2 shows the aspects of the two slot units 7A and 7B arranged on the front surface of the main body 2 of the video game apparatus 1. Each of the two slot units 7A and 7B has two stages. On the upper stages, memory card insertion units 8A and 8B into which a memory card 10 or a portable electronic device 100 (not shown) is inserted are formed. On the lower stages, controller connection units (jacks) 9A and 9B to which a connection terminal unit (connector) 26 of the controller 20 is connected are formed.

Each of the insertion holes (slots) of the memory card insertion units 8A and 8B is somewhat asymmetrically formed such that a memory card cannot be erroneously inserted into the corresponding memory card insertion unit in reverse. On the other hand, each of the controller connection units 9A and 9B is somewhat asymmetrically formed such that the connection terminal unit 26 cannot be erroneously connected to the corresponding controller connection unit in reverse. Each of the controller connection units 9A and 9B has a shape different from that of each of the memory card insertion units 8A and 8B such that a memory card cannot be erroneously inserted into the corresponding the controller connection unit.

Figure 3:
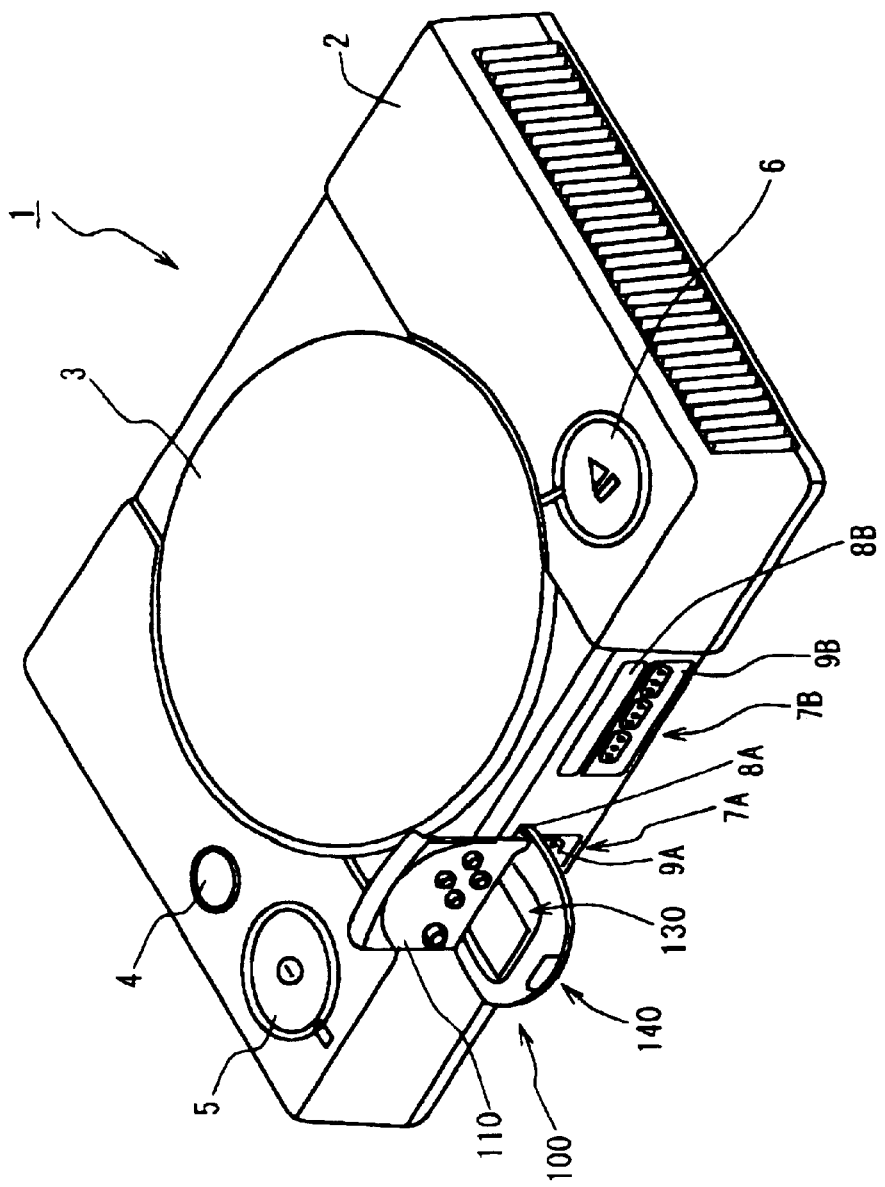
FIG. 3 is a perspective view showing the video game apparatus in FIG. 1 when a portable electronic device is inserted into the video game apparatus.

FIG. 3 shows the vide game device 1 in a state in which the portable electronic device 100 is inserted into the memory card insertion unit 8A of the slot unit 7A on the front surface of the video game device 1.

Figure 4:
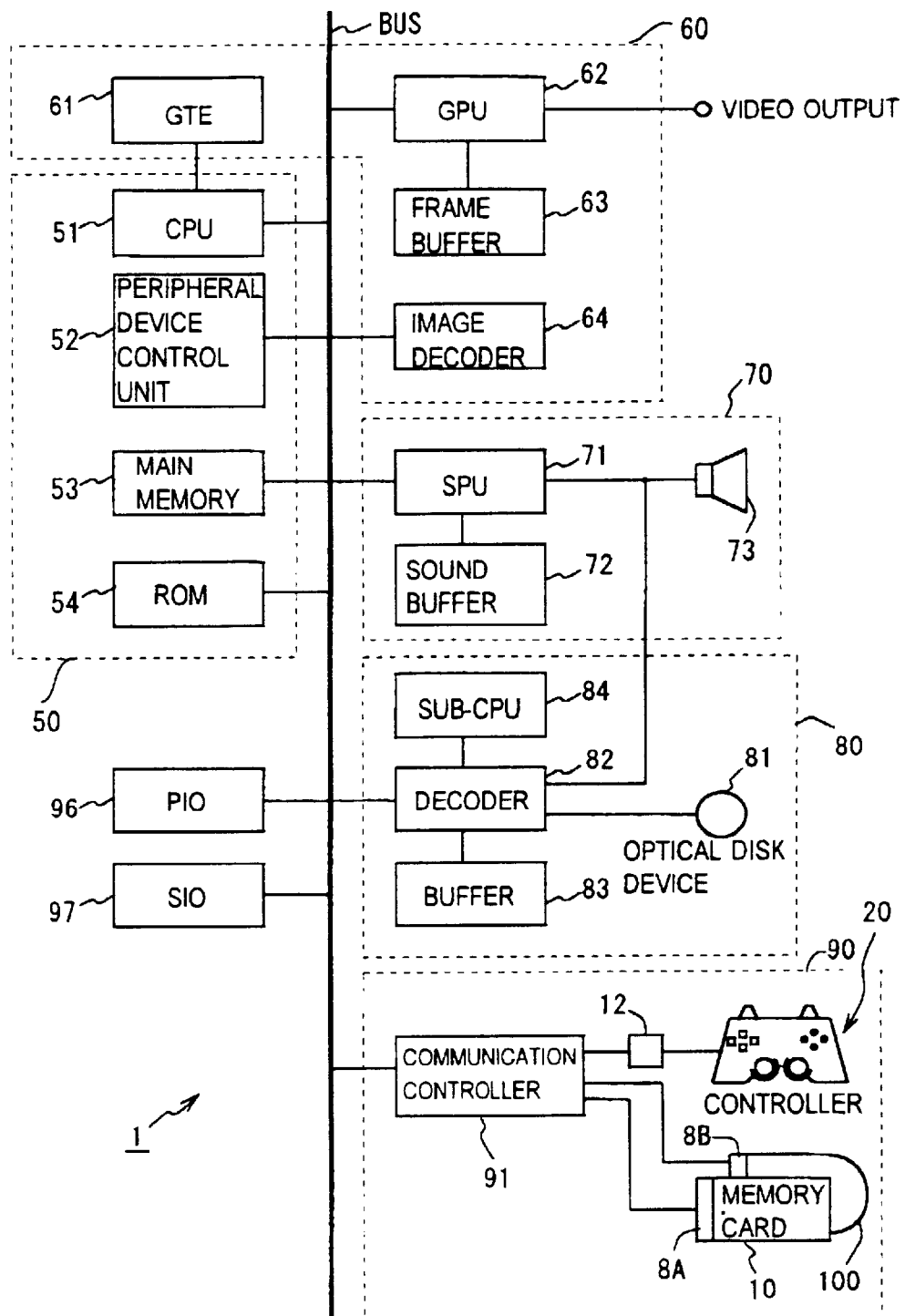
FIG. 4 is a block diagram showing an example of a schematic circuit configuration of a main part of the video game apparatus in FIG. 1.

FIG. 4 is a block diagram showing an example of a schematic circuit configuration of a main part of the video game device 1.

The video game device 1 comprises a control system 50 constituted by a central processing unit (CPU) 51, its peripheral units and the like, a graphic system 60 constituted by an image processing unit (GPU: Graphic Processing Unit) 62 or the like for drawing a picture in a frame buffer 63, a sound system 70 constituted by a sound processing unit (SPU) or the like for generating sound, sound effects, or the like, an optical disk control unit 80 for controlling an optical disk on which an application program is recorded, a communication control unit 90 for controlling an input/output operation of a signal from the controller 20 in which an instruction from a user is input and data from the memory card 10 or the portable electronic device 100 for storing settings of a game, and a bus BUS or the like to which the above units are connected.

The control system 50 has the CPU 51, a peripheral device control unit 52 for performing interrupt control or control or the like of direct memory access (DMA: Direct Memory Access) transfer, a main memory (main storage unit) 53 constituted by a random access memory (RAM), and a read-only memory (ROM) 54 in which a program such as a so-called operating system for managing the main memory 53, the graphic system 60, the sound system 70, and the like. The main memory 53 is a memory on which a program can be executed.

The CPU 51 executes the operating system stored in the ROM 54 to control the video game device 1 as a whole, and is constituted by a 32-bit RISC (reduced instruction set computer)—CPU.

When the video game device 1 is powered on, the CPU 51 of the control system 50 executes the operating system stored in the ROM 54, so that the CPU 51 performs control of the graphic system 60, the sound system 70, and the like.

When the operating system is executed, the CPU 51 performs initialization such as an operation check of the video game device 1 as a whole and then controls the optical disk control unit 80 to execute an application program such as a game recorded on the optical disk. When the execution of the program for a game or the like, the CPU 51 controls the graphic system 60, the sound system 70, and the like according to an input by a user to control display of an image and generation of sound effects and sound.

The graphic system 60 comprises a graphic data generation processor or a geometry transfer engine (GTE) 61 for performing a process such as coordinate conversion, the graphic processing unit (GPU) 62 for drawing a picture according to a drawing instruction from the CPU 51, a frame buffer 63 for storing the image drawn by the GPU 62, and an image decoder 64 for decoding image data which is compressed by orthogonal transformation such as discrete cosine conversion.

The GTE 61 functions as a co-processor 51. The GTE 61 comprises a parallel arithmetic operation mechanism for executing a plurality of arithmetic operations in parallel, so that arithmetic operations such as coordinate transformation, light source calculations, matrixes, or vectors can be performed at a high speed according to an arithmetic request from the CPU 51. More specifically, calculations of vertex coordinates of polygons according to the present invention are performed by the GTE 61. The GTE 61 can perform coordinate operations of a maximum of about 1.5 million polygons per second in arithmetic operations for performing flat shooting for drawing, e.g., one triangular polygon in the same color. In this manner, in the video game apparatus, a load on the CPU 51 can be reduced, and high-speed coordinate operations can be performed.

The GPU 62 operates according to a polygon drawing instruction from the CPU 51. The GPU 62 has a two-dimensional address space which is independent of the CPU 51 to draw polygons and the like in the frame buffer 63 serving as the address space. The GPU 62 is designed such that a maximum of about 360 thousand polygons may be drawn per second.

In addition, the frame buffer 63 is constituted by a so-called dual port RAM, and is designed such that drawing from the GPU 62 or transfer from the main memory 53 and reading for a display can be simultaneously performed. The frame buffer 63 has, e.g., a 1-Mbyte capacity, and is handled as 16-bit matrixes each of which has 1,024 pixels in width and 512 pixels in length.

In the frame buffer 63, in addition to a display region output as a video output, a CLUT region in which a color look up table (CLUT) which is referred to when the GPU 62 draws polygons or the like, and a texture region in which materials (textures) inserted (mapped) in the polygons or the like subjected to coordinate transformation in drawing and drawn by the GPU 62 are stored are formed. These CLUT region and texture region are dynamically changed according to a change of the display region or the like.

The GPU 62 is designed such that, in addition to the flat shading, gouraud shading for determining the colors of the polygons by interpolating the colors of vertexes of the polygons and texture mapping for pasting the textures stored in the texture region on the polygons can be performed. When the gouraud shading or the texture mapping is performed, the GTE 61 can perform coordinate operations of a maximum of about 500 thousand polygons per second.

In addition, the image decoder 64 is controlled by the CPU 51 and decodes image data of a static image or a moving picture to store the decoded data in the main memory 53.

The reproduced image data is stored in the frame buffer 63 through the main body 2, so that the image data can be used as a background of an image drawn by the GPU 62.

The sound system 70 comprises an SPU 71 for generating sound, sound effects, and the like on the basis of an instruction from the CPU 51, a sound buffer 72 in which waveform data or the like is recorded, and a loudspeaker 73 for outputting the sound, sound effects, and the like generated by the SPU 71.

The SPU 71 comprises an ADPCM decoding function for reproducing audio data obtained by performing adaptive differential PCM (ADPCM) to, e.g., 16-bit audio data as a 4-bit differential signal, a reproducing function for reproducing the waveform data stored in the sound buffer 72 to generate sound effects or the like, a modulating function for modulating and reproducing the waveform data stored in the sound buffer 72, and the like.

Since the sound system 70 comprises these functions, the sound system 70 can be used as a so-called sampling sound source for generating sound, sound effects, and the like on the basis of the waveform data recorded on the sound buffer 72 according to an instruction from the CPU 51.

The optical disk control unit 80 comprises an optical disk device 81 for generating a program, data, or the like recorded on an optical disk, a decoder 82 for decoding a program, data, or the like recorded with an error correction code (ECC), and a buffer 83 for temporarily storing data from the optical disk device 81 to make the reading speed of the data from the optical disk high. A sub-CPU 84 is connected to the decoder 82.

As the audio data read by the optical disk device 81 and recorded on the optical disk, the ADPCM data and so-called PCM data obtained by analog/digital-converting audio signal recorded on the optical disk is known.

Audio data which is recorded as ADPCM data such that the difference of, e.g., 16-bit digital data is expressed by 4 bits is decoded by the decoder 82, supplied to the SPU 71, and subjected to a process such as digital/analog conversion by the SPU 71, and used to drive the loudspeaker 73.

Audio data which is recorded as PCM data, e.g., 16-bit digital data is decoded by the decoder 82 and then used to drive the loudspeaker 73.

In addition, the communication control unit 90 has a communication controller 91 for controlling communication with the CPU 51 through the bus BUS. A controller connection unit 12 to which the controller 20 for inputting an instruction from a user is connected and memory card insertion units 8A and 8B to which a memory card 10 serving as an auxiliary storage device for storing setting data or the like of a game or a portable electronic device 100 (to be described later) is connected are arranged on the communication controller 91.

The controller 20 connected to the controller connection unit 12 has, e.g., 16 instruction keys to input an instruction from a user, and transmits the state of the instruction keys to the communication controller 91 by synchronous communication about 60 times per second according to the instruction from the controller 20. The communication controller 91 transmits the state of the instruction keys of the controller 20 to the CPU 51.

In this manner, the instruction from the user is input to the CPU 51, and the CPU 51 performs a process according to the instruction from the user on the basis of the game program or the like being executed.

Here, in reading a program, display of an image, image drawing, or the like, a large amount of image data must be transferred at a high speed among the main memory 53, the GPU 62, the image decoder 64, the decoder 82, and the like. Therefore, this video game apparatus, as described above, is designed to perform so-called DMA transfer in which data is directly transferred among the main memory 53, the GPU 62, the image decoder 64, the decoder 82, and the like under the control of the peripheral device control unit 52 without passing through the CPU 51. In this manner, a load on the CPU 51 generated by the data transfer can be reduced, and high-speed data transfer can be performed.

When setting data or the like of a game being executed must be stored, the CPU 51 transmits the data to be stored to the communication controller 91, and the communication controller 91 writes the data from the CPU 51 in the memory card 10 or the portable electronic device 100 which is inserted into the slot of the memory card insertion unit 8A or the memory card insertion unit 8B.

Here, a protection circuit for preventing electric breakdown is incorporated in the communication controller 91. The memory card 10 and the portable electronic device 100 are separated from the bus BUS, and can be attached to or detached from the slot while the main body of the apparatus is powered on. Therefore, when the memory capacity of the memory card 10 or the portable electronic device 100 is short, a new memory card 10 can be inserted without cutting the power supply of the main body of the apparatus. For this reason, without losing game data which must be in backup, the new memory card 10 can be inserted to write necessary data in the new memory card 10.

In addition, a parallel I/O interface (PIO) 96 and a serial I/O interface (SIO) 97 are interfaces for connecting the memory card 10 or the portable electronic device 100 to the video game device 1.

In the entertainment system described above, when perspective transformation according to this embodiment is executed, high-speed processing is executed by using approximate calculation.

Three-dimensional Graphics

Three-dimensional graphics are techniques in which, when an object placed in a three-dimensional space is viewed from a certain point of view, the perspective position of the object on a screen is supposed to be set in a certain position. In the entertainment system described above, in order to draw polygons, a series of processes, i.e., the process of performing a geometry operation by using a plurality of polygons of one screen as a unit, the process of performing sorting by Z values, and the process of performing drawing, are performed. These processes are performed step by step on a set of polygons of one screen.

The GTE 61 of the graphic system 60 functions as a co-processor for performing the geometry operation at a high speed. Of the high-speed operations, a typical geometry operation is provided to, e.g., a game programmer in the form of a library (or library function). An approximation of perspective transformation to be described below can be prepared as, e.g., a basic geometry library, and can be provided to a game programmer.

A calculation of perspective transformation is expressed as, e.g., Equations (1) and (2):

$$Sx = X \times (h/Z) \quad (1)$$

$$Sy = Y \times (h/Z) \quad (2)$$

Figure 5:
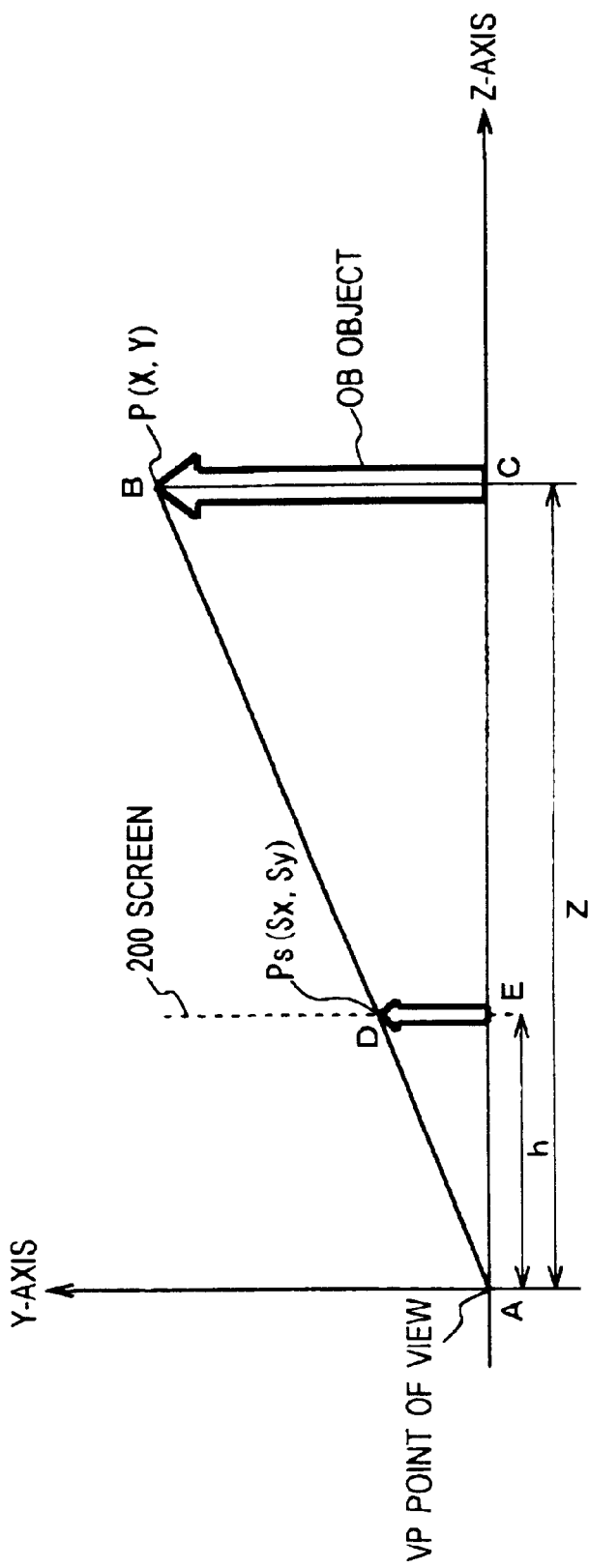
FIG. 5 is a diagram for explaining perspective transformation for, when an object (thing) is viewed from a point of view, calculating the position of one point for specifying the object on a screen.

Equations (1) and (2) are equations for, when an object OB is viewed from a point of view VP set at a certain point as shown in FIG. 5, calculating the position of a projected image of the object OB on a virtual screen 200.

In FIG. 5, a point of view VP is set as a coordinate origin A, a line of sight is pointed in the plus side of the Z axis, and the upper direction in FIG. 5 is defined as the Y axis. At this time, the X axis is omitted. In such a coordinate system, it is assumed that an arrow-like object OB is arranged on the Z axis.

When the coordinates of the summit of the arrow of the object OB is defined as P(X,Y), the summit of the projection of the arrow reflected on the screen 200 is represented by coordinates Ps (Sx,Sy).

Referring to FIG. 5, a triangle ABC is similar to a triangle ADE. The distance from the point of view VP to the object OB is represented by Z, and the distance from the point of view VP to the screen 200 is represented by h. In this case, scale factors (segment factors) of the two triangles which are similar to each other are represented by (h/Z). For this reason, the coordinate values of the summit coordinates Ps on the screen 200 can be expressed by Equations (1) and (2) described above.

The summit coordinates Ps (Sx, Sy) calculated by Equations (1) and (2) correspond to summit coordinates on the screen on which a basic figure (polygon) constituting an object of, e.g., a three-dimensional image. This relationship can also be satisfied with respect to the X-axis direction omitted in FIG. 5.

Figure 6:
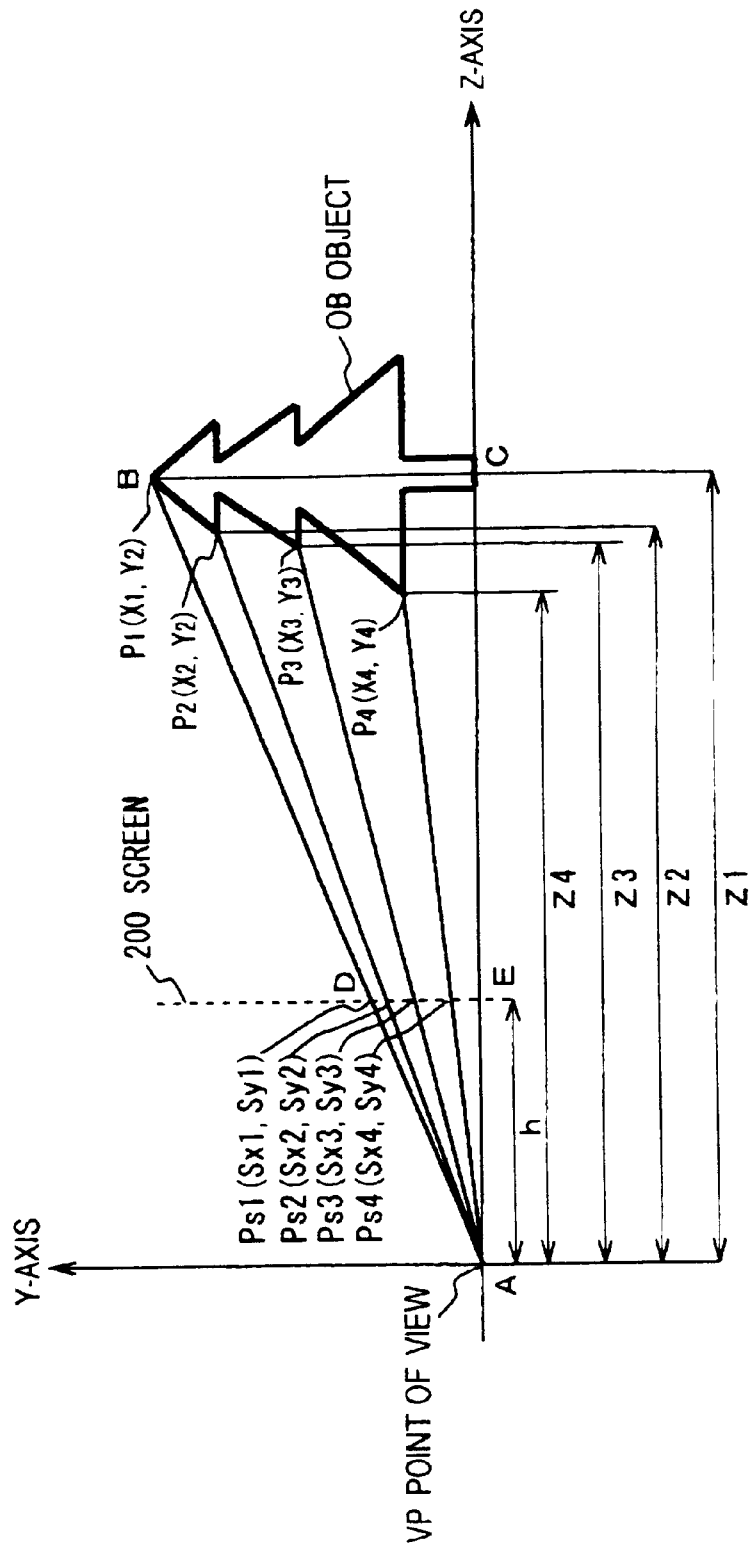
FIG. 6 is a diagram for explaining perspective transformation for, when an object is viewed from a point of view, calculating the positions of a plurality of points for specifying the object on a screen.

Perspective transformation must be performed to all the points constituting a three-dimensional object. Here, the case in which one single object is placed in the same scene is considered. FIG. 6 illustrates this case. In FIG. 6, as typical points constituting an object OB which is similar to a Christmas tree, four points P1 (X1,Y1), P2 (X2,Y2), P3 (X3,Y3), and P4 (X4,Y4) are specified. The distances from a point of view VP to the four points P1, P2, P3, and P4 of the object OB are represented by Z1, Z2, Z3, and Z4, respectively, and the distance from the point of view VP to a screen 200 is represented by h. At this time, coordinates Ps1 (Sx1,Sy1), Ps2 (Sx2,Sy2), Ps3 (Sx3,Sy3), and Ps4 (Sx4, Sy4) on the screen obtained by perspective-transforming the four points P1 to P4 can be expressed by the following equations, respectively:

$$Sx1 = X1 \times (h/Z1), \quad Sy1 = Y1 \times (h/Z1) \quad (3)$$

$$Sx2 = X2 \times (h/Z2), \quad Sy2 = Y2 \times (h/Z2) \quad (4)$$

$$Sx3 = X3 \times (h/Z3), \quad Sy3 = Y3 \times (h/Z3) \quad (5)$$

$$Sx4 = X4 \times (h/Z4), \quad Sy4 = Y4 \times (h/Z4) \quad (6).$$

These calculations are performed because, although the distance from the point of view VP to the screen 200 is constant, i.e., h, the distances from the point of view VP to the four points P1 to P4 are different from Z1, Z2, Z3, and Z4, respectively, and the scale factors of the similar figures are different from (h/Z1), (h/Z2), (h/Z3), and (h/Z4), respectively. For this reason, in order to perspective-transform the four specific points P1 to P4, scale factors (h/Z1), (h/Z2), to (h/Z4) the number of which is proportional to the number of points must be calculated. In general, if the object OB is constituted by N points, scale factors (h/Z) must be calculated times the number of which is proportional to the number of points N.

Figure 7:
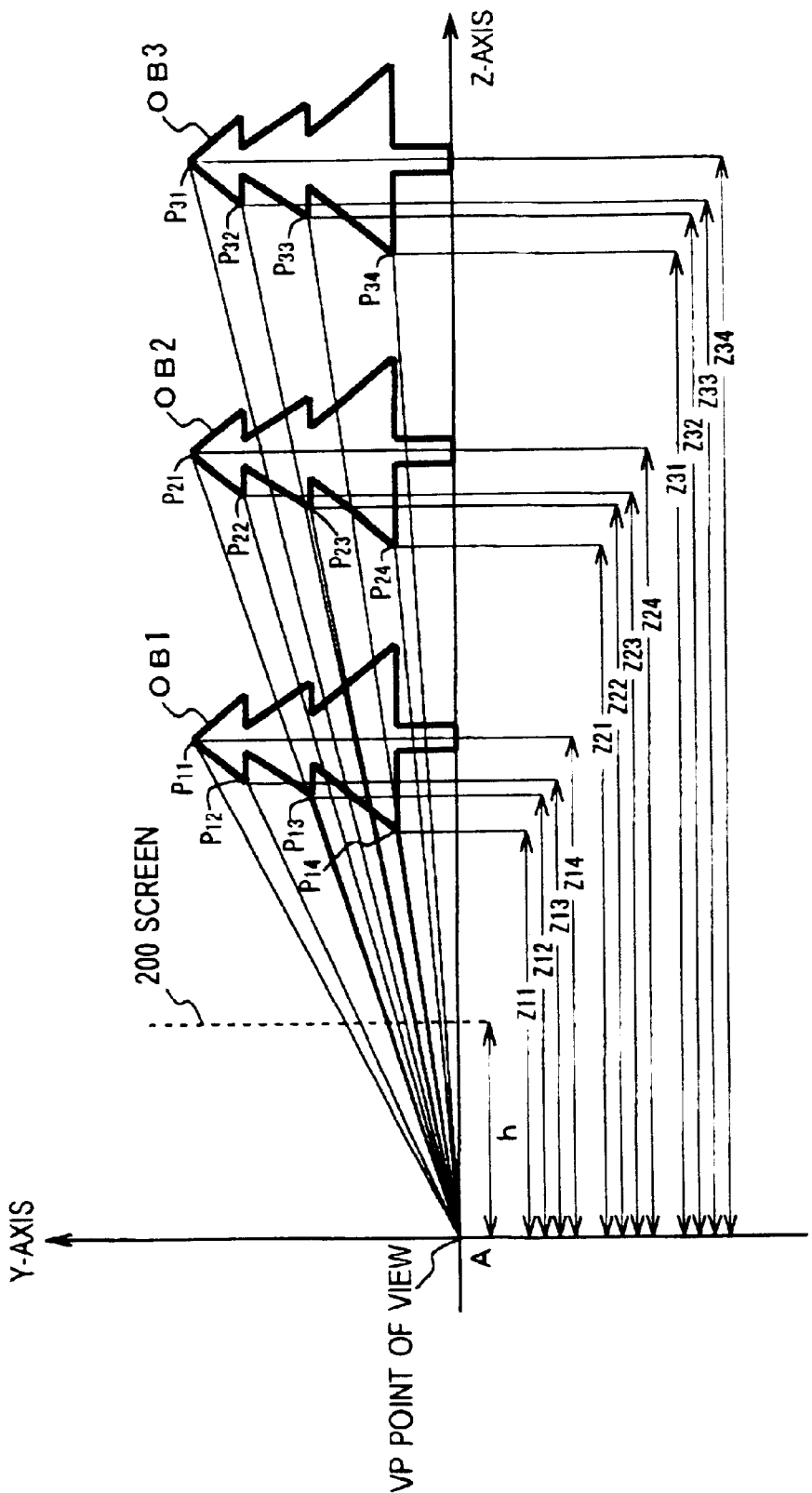
FIG. 7 is a diagram for explaining perspective transformation for, when a plurality of objects are present in the same scene, calculating the positions of a plurality of points for specifying the objects on a screen.

A case in which a plurality of objects are placed on the same scene will be considered. FIG. 7 is a diagram showing this case. In FIG. 7, three Christmas-tree-like objects OB each of which is the same as that shown in FIG. 6 are arranged with different distances from a point of view VP. These objects are represented by OB1, OB2, and OB3 in order of increasing the distance from the point of view VP.

It is assumed that each of the three objects OB1 to OB3 in FIG. 7 is constituted by four points as in FIG. 6. In this case, according to Equations (3) to (6), calculation for scale factors (h/Z) must be performed times the number of distances in the Z direction of each object, i.e., four times. Therefore, calculation must be performed 12 times for all the objects OB1 to OB3.

In general, it is assumed that M objects are constituted by N1 points, N2 points, . . ., Nm points, respectively. In this case, according to Equations (3) to (6), calculation for scale factors (h/Z) must be performed for the number of distances, i.e., (N1+N2+ . . . +Nm) times.

More specifically, it is assumed that the Z values of N1 points constituting the first object OB1 are represented by $ZOB1_1, ZOB1_2, \ldots, ZOB1_{N1}$, that the Z values of N2 points constituting the second object OB2 are represented by $ZOB2_1, ZOB2_2, \ldots, ZOB2_{N2}$, and, similarly, that the Z values of Nm points constituting the Mth object OBM are represented by $ZOBM_1, ZOBM_2, \ldots, ZOBM_{Nm}$. In this case, $(h/ZOB1_1), (h/ZOB1_2), \ldots, (h/ZOBM_{Nm})$ must be calculated. In this manner, amounts of calculation of these scale factors (h/Z) are enormous.

(Case in Which it is Regarded that Object is Localized in Space)

However, it may be assumed that a single object is sufficiently spaced apart from a point of view, and that the object is localized in the space. It is assumed that the object is constituted by N points. The distances from the point of view VP to points $P_1, P_2, \ldots, P_N$ are represented by $Z_1, Z_2, \ldots, Z_N$, respectively.

In such a case, the differences between the Z values of the distances $Z_1, Z_2, \ldots, Z_N$ from the point of view VP to the points constituting the objects are relatively considerably smaller than the Z values of the distances from the point of view VP to the points constituting the objects. As described above, when it can be assumed that the points constituting the objects are localized in the space, the following expressions are satisfied:

$$|minZ - maxZ| \cdot |minZ| \qquad (7)$$

$$|minZ - maxZ| \cdot |maxZ| \qquad (8), or$$

$$|minZ - maxZ| \cdot |meanZ| \qquad (9)$$

where, $minZ = min(Z_1, Z_2, \ldots, Z_N)$ is satisfied, i.e., minZ represents the minimum value of the values ($Z_1$, $Z_2, \ldots, Z_N$) of the distances from the point of view VP to the points constituting the objects, $maxZ = max(Z_1, Z_2, \ldots, Z_N)$ is satisfied, i.e., maxZ represents the maximum value of the values ($Z_1$, $Z_2, \ldots, Z_N$) of the distances from the point of view VP to the points constituting the objects, $meanZ = mean(Z_1, Z_2, \ldots, Z_N)$ is satisfied, i.e., meanZ represents an average value $meanZ = (Z_1 + Z_2 + \ldots + Z_N)/N$ of the values ($Z_1, Z_2, \ldots, Z_N$) of the distances from the point of view VP to the points constituting the objects, and <<: represents that the value of the left member is considerably smaller than that of the right member.

Figure 8:
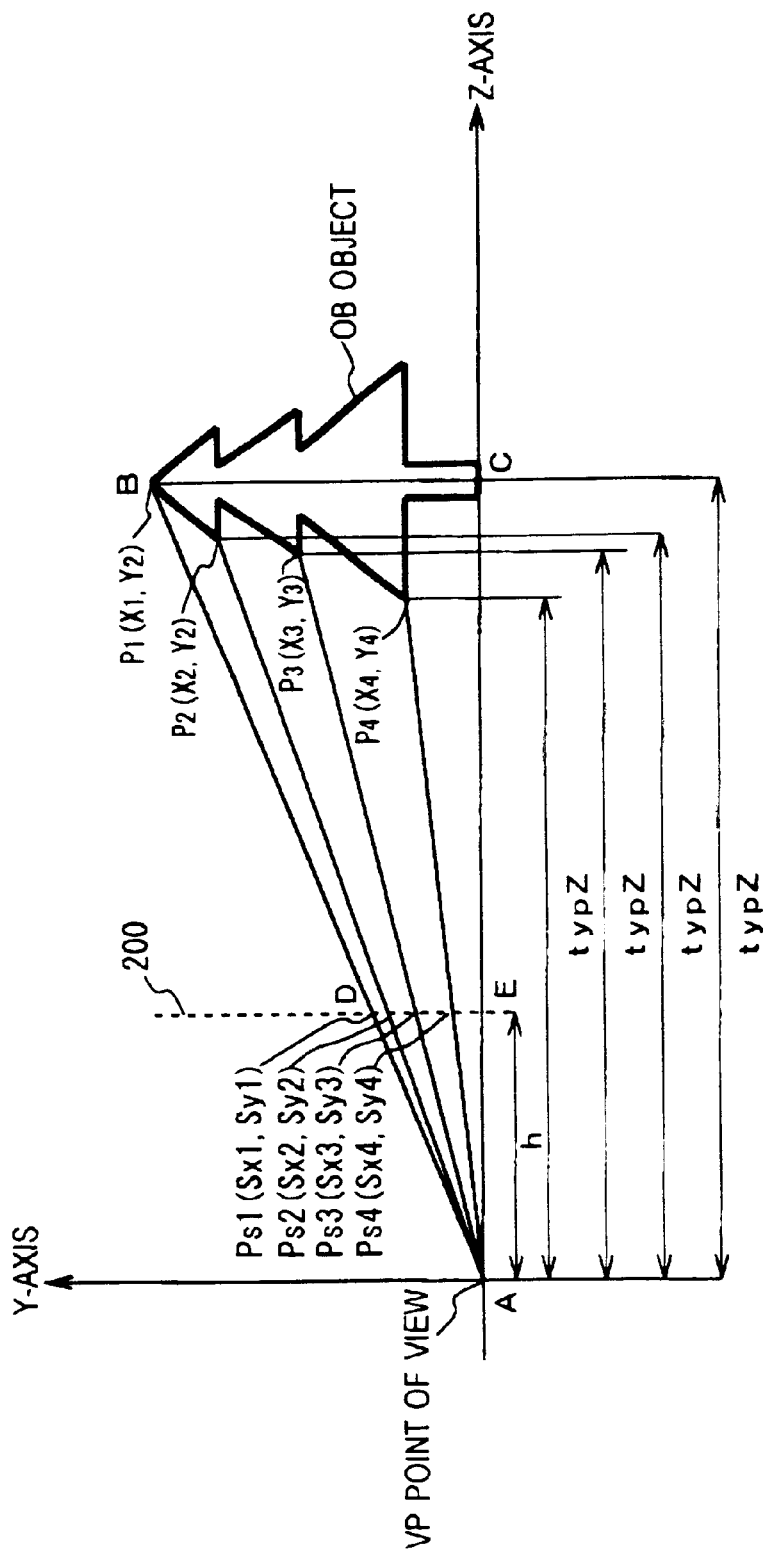
FIG. 8 is a diagram for explaining perspective transformation performed by approximating the object (thing) in FIG. 6.

When equations (7)–(9) are satisfied, the distances of the Z values of the points constituting the object are considerably smaller than the Z values of the points constituting the object. For this reason, it is understood that an image is slightly influenced even if the differences are neglected when the object is drawn. Therefore, as shown in FIG. 8, the Z values of all the points constituting the object are approximated by a typical value typZ, an influence on an image can be almost neglected. For example, an average value meanZ= $(Z_1, Z_2, \ldots, Z_N)/N$ of the Z values $(Z_1, Z_2, \ldots, Z_N)$ of n points constituting the object is defined as the typical value typZ, and the Z values of the object can be approximated by using the typical value typZ.

For example, when each Z value is approximated by using the typical value typZ to perform perspective transformation, the coordinates of the object on the screen can be expressed by the following equations:

$$Sx1 = X1 \times (h/typZ), Sy1 = Y1 \times (h/typZ) \qquad (10)$$

$$Sx2 = X2 \times (h/typZ), Sy2 = Y2 \times (h/typZ) \qquad (11)$$

$$Sx3 = X3 \times (h/typZ), Sy3 = Y3 \times (h/typZ) \qquad (12)$$

$$SxN = XN \times (h/typZ), SyN = YN \times (h/typZ) \qquad (13)$$

In calculations of Equation (10) to (13), a calculation for a scale factor (h/Z) of one object is completed by calculating (h/typZ) only once. More specifically, in perspective transformation of all the points constituting the object, an approximate scale factor (h/typ) can be used.

In a computer, division for calculating scale factors is basically performed by repeating subtraction. For this reason, when calculation for a scale factor is satisfactorily performed only once for each object, the number of arithmetic operations can be considerably reduced.

(Case in Which it is Regarded that a Plurality of Objects are Localized in Units of Objects in Space)

The case in which a plurality of objects OB1 to OBM are placed on the same scene will now be considered. It may be assumed that all these objects OB1 to OBM are sufficiently spaced apart from a point of view VP, and that the objects are localized together in units of objects in the space. In other words, the later condition indicates that the objects are sufficiently spaced apart from each other.

It is assumed that the first object OB1 is constituted by N1 points, that the second object OB2 is constituted by N2 points, . . . , and that the Mth object OBM is constituted by NM points.

It is assumed that the distances from the point of view VP to points $OB1_1, OB1_2, \ldots, OB1_{N1}$ of the first object OB1 are represented by $Z1_1, Z1_2, \ldots, Z1_{N1}$, respectively. It is assumed that the distances from the point of view VP to points $OB2_1, OB2_2, \ldots, OB2_{N2}$ of the second object OB2 are represented by $Z2_1, Z2_2, \ldots, Z2_{N2}$, respectively. Similarly, it is assumed that the distances from the point of view VP to points $OBM_1$, $OBM_2$, ..., $OBM_{NM}$ of the Mth object OBM are represented by $ZM_1$, $ZM_2$, ..., $ZM_{NM}$, respectively.

In such a case, since all these objects are sufficiently spaced apart from the point of view VP, relationships which are similar to the relationships expressed by Expressions (7) to (9) are obtained:

$$|minZ-maxZ| \ll |minZ| \quad (14),$$

$$|minZ-maxZ| \ll |maxZ| \quad (15), \text{ or}$$

$$|minZ-maxZ| \ll |meanZ| \quad (16)$$

where,
  $minZ=min(Z1_1, \ldots, ZM_{NM})$ is satisfied, i.e., minZ represents the minimum value of the values $(Z1_1, \ldots, ZM_{NM})$ of the distances from the point of view VP to the points constituting all the objects OB1 to OBM,
  $maxZ=max(Z1_1, \ldots, ZM_{NM})$ is satisfied, i.e., maxZ represents the maximum value of the values $(Z1_1, \ldots, ZM_{NM})$ of the distances from the point of view VP to the points constituting all the objects OB1 to OBM,
  $meanZ=mean(Z1_1, \ldots, ZM_{NM})$ is satisfied, i.e., meanZ represents the average value $meanZ1=(Z1_1+ \ldots +ZM_{NM})/(N1+ \ldots +NM)$ of the values $(Z1_1, \ldots, ZM_{NM})$ of the distances from the point of view VP to the points constituting all the objects OB1 to OBM, and
  $\ll$: represents that the value of the left member is considerably smaller than that of the right member.

Since the plurality of objects OB1 to OBM are localized in the space in units of objects, the points constituting a specific object are sufficiently spaced apart from the points constituting the other objects. In particular, the points constituting the specific object are also sufficiently spaced apart from the points constituting the objects adjacent to the specific object.

When it can be assumed that the points constituting the objects in the space are localized in units of objects, the following expressions are satisfied:

$$|minZ1-maxZ1| \ll |meanZ1-meanZ2| \quad (17)$$

$$|minZ2-maxZ2| \ll |meanZ1-meanZ2| \quad (18)$$

$$|minZ2-maxZ2| \ll |meanZ2-meanZ3| \quad (19)$$

$$|minZ3-maxZ3| \ll |meanZ2-meanZ3| \quad (20)$$

$$|minZM\text{-}1-maxZM\text{-}1| \ll |meanZM\text{-}1-meanZM| \quad (21)$$

$$|minZM-maxZM| \ll |meanZM\text{-}1-meanZM| \quad (22)$$

where,
  $minZ1=min(Z1_1, Z1_2, \ldots, Z1_{N1})$ is satisfied, i.e., minZ1 represents the minimum value of the values $(Z1_1, Z1_2, \ldots, Z1_{N1})$ of the distances from the point of view VP to N1 points constituting the first object OB1,
  $minZ2=min(Z2_1, Z2_2, \ldots, Z2_{N2})$ is satisfied, i.e., minZ2 represents the minimum value of the values $(Z2_1, Z2_2, \ldots, Z2_{N2})$ of the distances from the point of view VP to N2 points constituting the second object OB2, and
  similarly, $minZM=min(ZM_1, ZM_2, \ldots, ZM_{NM})$ is satisfied, i.e., minZ1 represents the minimum value of the values $(ZM_1, ZM_2, \ldots, ZM_{NM})$ of the distances from the point of view VP to NM points constituting the Mth object OBM.

Next,
  $maxZ1=max(Z1_1, Z1_2, \ldots, Z1_{N1})$ is satisfied, i.e., maxZ1 represents the maximum value of the values $(Z1_1, Z1_2, \ldots, Z1_{N1})$ of the distances from the point of view VP to N1 points constituting the first object OB1,
  $maxZ2=max(Z2_1, Z2_2, \ldots, Z2_{N2})$ is satisfied, i.e., maxZ2 represents the maximum value of the values $(Z2_1, Z2_2, \ldots, Z2_{N2})$ of the distances from the point of view VP to N2 points constituting the second object OB2, and
  similarly, $maxZM=max(ZM_1, ZM_2, \ldots, ZM_{NM})$ is satisfied, i.e., maxZ1 represents the maximum value of the values $(ZM_1, ZM_2, \ldots, ZM_{NM})$ of the distances from the point of view VP to NM points constituting the Mth object OBM.

Furthermore,
  $meanZ1=mean(Z1_1, Z1_2, \ldots, Z1_{N1})$ is satisfied, i.e., meanZ1 represents the average value $meanZ1=mean(Z1_1+Z1_2+ \ldots +Z1_{N1})/N1$ of the values $(Z1_1, Z1_2, \ldots, Z1_{N1})$ of the distances from the point of view VP to N1 points constituting the first object OB1,
  $meanZ2=mean(Z2_1, Z2_2, \ldots, Z2_{N2})$ is satisfied, i.e., meanZ2 represents the average value $meanZ2=mean(Z2_1+Z2_2+ \ldots +Z2_{N2})/N2$ of the values $(Z2_1, Z2_2, \ldots, Z2_{N2})$ of the distances from the point of view VP to N2 points constituting the second object OB2, and
  similarly, $meanZM=mean(ZM_1, ZM_2, \ldots, ZM_{NM})$ is satisfied, i.e., meanZ1 represents the average value $meanZ2=mean(ZM_1+ZM_2+ \ldots +ZM_{NM})/NM$ of the values $(ZM_1, ZM_2, \ldots, ZM_{NM})$ of the distances from the point of view VP to NM points constituting the Mth object OBM.
  $\ll$: represents that the value of the left member is considerably smaller than that of the right member.

When the above equations are satisfied, the differences between the Z values of points constituting a specific object when a plurality of objects are drawn are considerably smaller than the differences between the Z values of points constituting objects adjacent to the specific objects. It is understood that an image is slightly influenced even if the differences are neglected.

For example, an average value $meanZM=(ZM_1+ZM_2+ \ldots +ZM_{NM})/NM$ of the Z values $(ZM_1, ZM_2, \ldots, ZM_{NM})$ of NM points constituting a specific object (e.g., the Mth object) is defined as a typical value typZM, and the Z values of an object can be approximated by using the typical value typZM.

Figure 9:
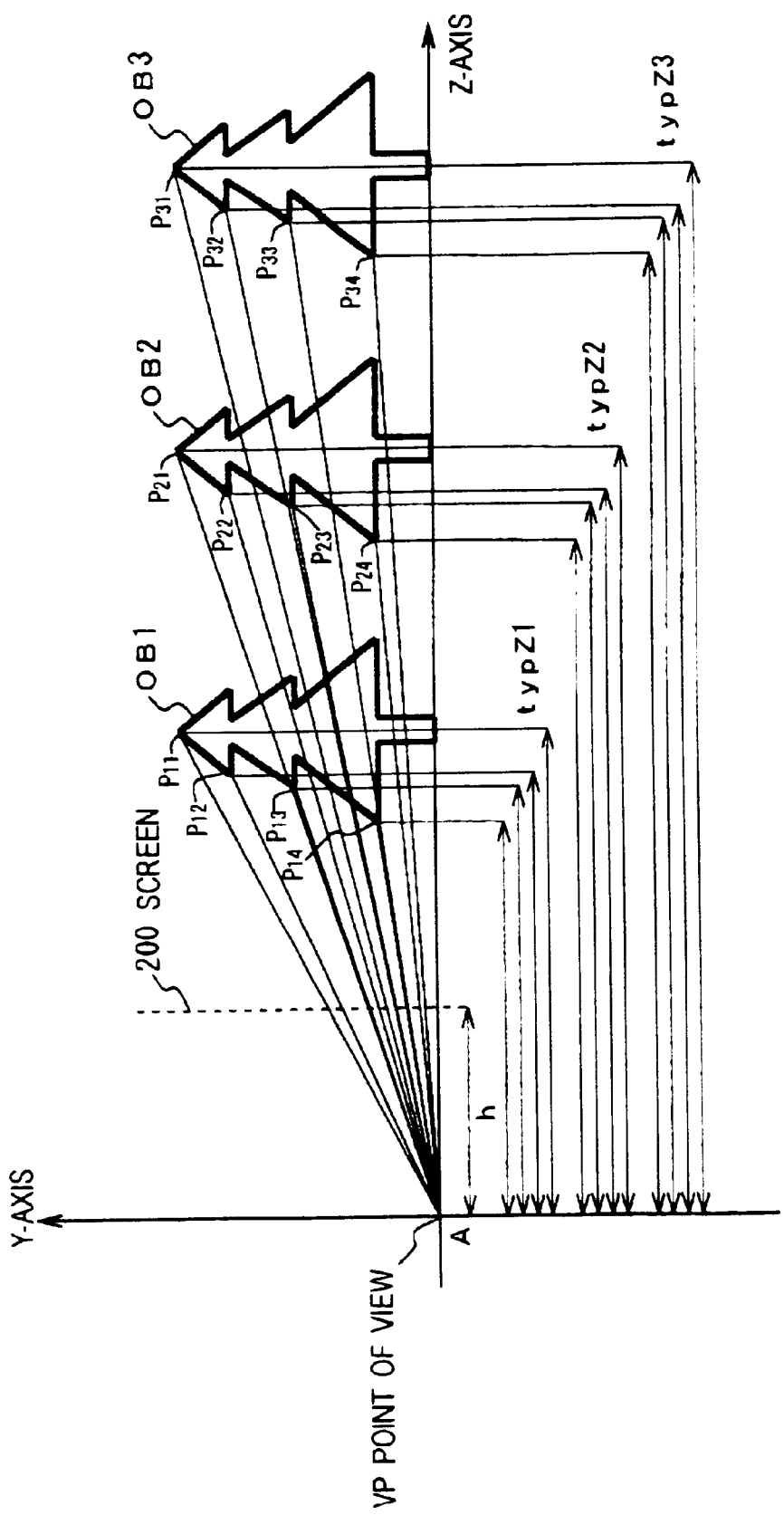
FIG. 9 is a diagram for explaining perspective transformation performed by approximating the plurality of objects (things) in FIG. 7 in units of objects.

For this reason, as shown in FIG. 9, even if the Z values of all points constituting a plurality of objects are respectively approximated by typical values $typZ_1$, $typZ_2$, ..., TypZM in units of objects, an influence on an image can be almost neglected.

The first object OB1 is constituted by N1 points, and the Z values of all the points can be approximated by the typical value typZ1. For this reason, a scale factor can be approximated by calculating (h/typZ1).

The second object OB2 is constituted by N2 points, and the Z values of all the points can be approximated by the typical value typZ2. For this reason, a scale factor can be approximated by calculating (h/typZ2).

The Mth object OBM is constituted by NM points, and the Z values of all the points can be approximated by the typical value typZM. For this reason, a scale factor can be approximated by calculating (h/typZM).

In this manner, the plurality of objects OB1 to OBM are constituted by N1 to NM points, respectively, and the M objects OB1 to OBM can be approximated by using the typical values typZ1 to typZM of the Z values. For this reason, the scale factors can be perspective-transformed by performing approximation of (h/typZ1), (h/typZ2), ..., (h/typZM).

When a plurality of objects exist, a calculation for a scale factor (h/Z) of each object is completed by calculating (h/typZ) once for the corresponding object. More specifically, in perspective transformation of all the points constituting the plurality of objects, approximate scale factors (h/typZ) can be used in units of objects.

In a computer, division for calculating scale factors is basically performed by repeating subtraction. For this reason, when calculation for a scale factor is satisfactorily performed once for each object, the number of arithmetic operations can be considerably reduced.

(Criterion of Decision)

Criterions for deciding whether it can be assumed that a single object is localized in a space will be described below.

The present inventor uses the following values as criterions for deciding whether Expressions (7) to (9) are satisfied, i.e., all points constituting the object are independently calculated by changing the Z values of the scale factor (h/Z) or can be approximated by using the typical value typZ (meanZ in the above case) of the Z values:

$$|minZ-maxZ| \div |minZ| \cdot K1 \qquad (23),$$

$$|minZ-maxZ| \div |maxZ| \cdot K1 \qquad (24), \text{or}$$

$$|minZ-maxZ| \div |meanZ| \cdot K1 \qquad (25).$$

The values of the left members of Expressions (23) to (25) are K1 or less, it is determined that the objects can be approximated. Expressions (23) to (25) mean that the ratios of the differences between the minimum value minZ and the maximum value maxZ of the points constituting the object to the typical values minZ, maxZ, and meanZ are the predetermined value K1 or less.

It is assumed that the value K1 of Expressions (23) to (25) is a predetermined value, e.g., K1=0.1. In this case, the absolute value of the difference between the minimum value and the maximum value of the Z values of the object OB is equal to or smaller than 1/10 of the absolute value of the typical value (minimum value minZ, maximum value maxZ, or average value meanZ) of the Z values of the object, and it is determined that all the Z values of the object can be approximated by the typical value typZ of one Z value.

As a matter of course, the value of K1 can be arbitrarily set depending on an application program to be applied, a scene to be applied, or the like. The value of K1 need not be always a constant value, and may be changed depending on the application program to be applied, the scene to be applied, or the like. When a plurality of objects exist in the same scene, a specific object can be approximated by a typical value, and the other objects can also be calculated such that the values of the objects are calculated.

Criterions for deciding whether it may be assumed that all objects are localized in a space and localized in the space in units of objects will be described below.

The present inventor uses the following values as criterions for deciding whether it can be assumed that all the objects are localized as in Expressions (23) to (25). The following values are used as the criterions of decision to satisfy Expressions (14) to (16).

$$|minZ-maxZ| \div |minZ| \cdot K1 \qquad (26),$$

$$|minZ-maxZ| \div |maxZ| \cdot K1 \qquad (27), \text{or}$$

$$|minZ-maxZ| \div |meanZ| \cdot K1 \qquad (28).$$

The values of Expressions (26) to (28) are K1 or less, it is determined that the objects can be approximated. The contents of Expressions (26) to (28) and the predetermined value K1 are as described above.

Since Expressions (17) to (22) are satisfied, the present inventor uses the following values as criterions for deciding whether a plurality of objects are localized in a space in units of objects:

$$|minZ1-maxZ1| \div |meanZ1-meanZ2| \cdot K2 \qquad (29)$$

$$|minZ2-maxZ2| \div |meanZ1-meanZ2| \cdot K2 \qquad (30)$$

$$|minZ2-maxZ2| \div |meanZ2-meanZ3| \cdot K2 \qquad (31)$$

$$|minZ3-maxZ3| \div |meanZ2-meanZ3| \cdot K2 \qquad (32)$$

$$|minZM-1-maxZM-1| \div |meanZM-1-meanZM| \cdot K2 \qquad (33)$$

$$|minZM-maxZM| \div |meanZM-1-meanZM| \cdot K2 \qquad (34)$$

If the values of Expressions (29) and (30) are K2 or less, it can be determined that the first object OB is sufficiently spaced apart from the second object OB2. If the values of Expressions (31) and (32) are K2 or less, it can be determined that the second object OB2 is sufficiently spaced apart from the third object OB3. Similarly, if the values of Expressions (33) and (34) are K2 or less, it can be determined that the (M−1)th object OBM-1 is sufficiently spaced apart from the Mth object OBM.

Expressions (29) to (34) mean that the ratio of the difference (|meanZ2−meanZ3|) between the distance from the point of view to a specific object (e.g., OP2) and the distance from the point of view to an object adjacent to the specific object to the difference (|minZ2−maxZ2|) between the minimum value and the maximum value of the distances from the point of view VP to a plurality of points constituting the specific object is a predetermined value K2 or less.

When the value K2 of Expressions (29) to (34) is a predetermined value, e.g., K2=0.1, the ratio of the difference between the distance from the point of view to a specific object (e.g., OP2) and the distance from the point of view to an object (e.g., OP3) adjacent to the specific object to the difference between the minimum value and the maximum value of the distances from the point of view VP to a plurality of points constituting the specific object is 1/10 or less. It is determined that the Z values of all the points of the object (e.g., OP2) can be approximated by one typical value (e.g., typZ2) of Z values.

As a matter of course, the value of K2 can be changed depending on an application program to be applied, a scene to be applied, or the like. The value of K2 need not be always a constant value, and may be changed depending on the application program to be applied, the scene to be applied, or the like. When a plurality of objects exist in the same scene, a specific object can be approximated by a typical value, and the other objects can also be calculated such that the Z values of the respective points of the objects are calculated.

(Selection of Typical Value typZ)

A method of selecting a typical value typZ of the Z values will be described below. The scale factor changes depending on the selection of the typical value.

In the embodiment described above, as a typical value of Z values, the average value meanZ of the Z values of points constituting the object is set. For example, as the typical value typZ, a value given by the following equations:

$$typZ=meanZ=(Z1+Z2+ \ldots +Zn)/N \qquad (35).$$

In Equation (35), the average value of points (Z0+Z1+Z2+ ... +Zn) constituting one object as in the above embodiment is set as the distance of a typical point (typical value of Z values). In this case, the scale factor (h/Z) is given by (h/meanZ).

$$typZ = Z1 \quad (36)$$

In Equation (36), the first Z value of Z values (Z1, Z2, ..., Zn) of the points constituting the object is set as the distance of the typical point. In this case, the scale factor (h/Z) is given by (h/Zn).

$$typZ = Zn \quad (37)$$

In Equation (37), the last (i.e., the Nth) Z value of the Z values (Z1, Z2, ..., Zn) of the points constituting the object is set as the distance of the typical value. In this case, the scale factor (h/Z) is given by (h/Zn).

The methods expressed by Equations (35) to (37) are also called replacing methods.

A method of calculating a scale factor by a primary (linear) approximation may be employed.

$$\{(maxZ-Z)/(maxZ-minZ)\} \times (h/minZ) + \{(Z-minZ)/(maxZ-minZ)\} \times (h/maxZ) \quad (38)$$

In Expression (38), a value h/Z of the typical point of the Z values are linearly approximated (primarily approximated) by using h/maxZ obtained by the maximum value maxZ and h/minZ obtained by the minimum value minZ. Expression (38) is also called a linear (primary) approximation.

A method of calculating a scale factor (h/Z) by a quadratic approximation may be employed.

$$\{h/(minZ \times maxZ \times midZ)\} \times [(Z \times Z) - 3.0 \times midZ \times Z + 0.5 \times \{(minZ \times minZ) + (maxZ \times maxZ) + 4.0(minZ \times maxZ)\}] \quad (39)$$

where midZ=(maxZ+minZ)/2 is satisfied, i.e., midZ is the average value of maxZ and minZ.

In Expression (39), a value (h/Z) of the typical point of the Z values is calculated by a quadratic approximation.

This quadratic approximation is concretely performed by the following method. When the scale factor (h/Z) is approximated by a quadratic curve, a quadratic equation $f(Z) = A \cdot Z^2 + B \cdot Z + C$ is given. When Z=minZ, f(Z)=h/minZ is satisfied. When Z=maxZ, f(Z)=h/maxZ is satisfied. When Z=midZ, f(Z)=h/midZ is satisfied. Using these relationships, the three following equations are satisfied:

$$A \cdot minZ^2 + B \cdot minZ + C = h/minZ \quad (40)$$

$$A \cdot minZ^2 + B \cdot minZ + C = h/minZ \quad (41)$$

$$A \cdot minZ^2 + B \cdot minZ + C = h/minZ \quad (42)$$

Since three variables A, B, and C are used, and three quadratic equations are satisfied, the solutions of these variables can be calculated. When Equations (40) to (42) are solved, the following solutions are obtained:

$$A = h/(minZ \times maxZ \times midZ) \quad (43)$$

$$B = A \cdot (-3.0 \times midZ) \quad (44)$$

$$C = A \cdot [(0.5 \times \{(minZ \times minZ) + (maxZ \times maxZ) + 4.0(minZ \times maxZ)\}] \quad (45)$$

When the values of A, B, and C are substituted in the quadratic equation $f(Z) = A \cdot Z^2 + B \cdot Z + C$, Expression (39) is obtained. Expression (39) is also called a quadratic approximation.

In the approximation of these scale factors, the scale factors can be calculated by performing division once in Equations (35), (36), and (37) according to the replacing method. In Expression (38) according to the linear approximation, a scale factor can be calculated by performing division twice. In Expression (39) according to the quadratic approximation, a scale factor can be calculated by performing division three times.

Although the numbers of additions and multiplications is increased in the linear approximation and the quadratic approximation, in general computer processing, addition and multiplication can be processed at a speed higher than that of division. Therefore, even in the linear approximation and the quadratic approximation, processing can be performed at a speed higher than that in the case in which the scale factors of points constituting an object are respectively calculated.

The replacing method, the linear approximation, and the quadratic approximation have been described above. When the order is increased, i.e., a tertiary approximation, a quaternary approximation, or a higher-order approximation is performed, scale factors can be approximated with higher precision.

The present invention relates to a computer graphic process, and can provide a novel method and apparatus for perspective-transforming a three-dimensional thing on a virtual two-dimensional screen.

What is claimed is:

1. An apparatus for perspective transformation of an object in three-dimensional space on a virtual two-dimensional screen, the object being specified by a plurality of points, the apparatus comprising a graphics unit operable to use coordinate values of a typical point of the plurality of points in performing an approximate perspective transformation of the plurality of points of the object, wherein the typical point is selected from the plurality of points by any method, and distances from the point of view to the other points are approximated on the basis of a distance from the point of view to the typical point.

2. An apparatus according to claim 1, wherein the plurality of points represent vertex coordinates of polygons defining the object.

3. An apparatus according to claim 1, wherein the typical point is determined by a replacing method applied to coordinate values of the plurality of points.

4. An apparatus according to claim 1, wherein distances from the point of view to the other points are approximated on the basis of an average value of the distances from the point of view to the plurality of points.

5. An apparatus according to claim 1, wherein the typical point is set as a first selected one of the plurality of points, and distances from the point of view to the other points are approximated on the basis of a distance from the point of view to the first selected point.

6. An apparatus according to claim 1, wherein the typical point is set as a last selected one of the plurality of points, and distances from the point of view to the other points are approximated on the basis of a distance from the point of view to the last selected point.

7. An apparatus for perspective transformation of an object in three-dimensional space on a virtual two-dimensional screen, the object being specified by a plurality of points, the apparatus comprising a graphics unit operable to use coordinate values of a typical point of the plurality of points in performing an approximate perspective transformation of the plurality of points of the object, wherein the perspective transformation is based on an approximation of ratio, h/Z, obtained from a linear approximation expression:

$$\{(maxZ-Z)/(maxZ-minZ)\} \times (h/minZ) + \{(Z-minZ)/(maxZ-minZ)\} \times (h/maxZ),$$

where Z represents distances from the point of view to the plurality of points, maxZ represents a maximum distance from the point of view to the plurality of points minZ represents a minimum distance from the point of view to the plurality of points, and h represents a distance from the point of view to the virtual screen.

8. An apparatus for perspective transformation of an object in three-dimensional space on a virtual two-dimensional screen, the object being specified by a plurality of points, the apparatus comprising a graphics unit operable to use coordinate values of a typical point of the plurality of points in performing an approximate perspective transformation of the plurality of points of the object, wherein the perspective transformation is based on an approximation of ratio, h/Z, obtained from a quadratic approximation expression:

$$\{h/(minZ \times maxZ \times midZ)\} \times \{(Z \times Z) - 3.0 \times midZ \times Z + 0.5 \times \{(minZ \times minZ) + (maxZ \times maxZ) + 4.0(minZ \times maxZ)\}\},$$

where Z represents distances from the point of view to the plurality of points, maxZ represents a maximum distance from the point of view to the plurality of points, minZ represents a minimum distance from the point of view to the plurality of points, midZ represents an average value of maxZ and minZ, and h represents a distance from the point of view to the virtual screen.

9. An apparatus for perspective transformation of an object in three-dimensional space on a virtual two-dimensional screen, the object being specified by a plurality of points, the apparatus comprising a graphics unit operable to use coordinate values of a typical point of the plurality of points in performing an approximate perspective transformation of the plurality of points of the object, wherein the graphics unit is further operable to determine whether the plurality of points are localized with respect to a point of view in the three-dimensional space.

10. An apparatus according to claim 9, wherein:

distances from the point of view to the plurality of points are represented by Z values, a minimum Z value of the object is minZ, a maximum Z value of the object is—maxZ, an average of the Z values of the object is meanZ; and the graphics unit determines that the plurality of points are localized when the following expressions are satisfied:

$$|minZ-maxZ|+|minZ| \cdot K1,$$

$$|minZ-maxZ|+|maxZ| \cdot K1, \text{ or}$$

$$|minZ-maxZ|+|meanZ| \cdot K1$$

where K1 is a scalar.

11. An apparatus according to claim 10, wherein K1 is smaller than 1.0.

12. An apparatus according to claim 10, wherein K1 varies depending on an application program.

13. An apparatus according to claim 10, wherein K1 varies depending on a graphics scene.

14. An apparatus according to claim 9, wherein the graphics unit is operable to determine whether the plurality of points are localized in the three-dimensional space with respect to a direction along a line of sight extending from the point of view to the object.

15. An apparatus according to claim 14, wherein the line of sight is in a Z-axis direction of an XYZ coordinate system associated with the point of view, and Z values that represent distances from the point of view to the plurality of points are obtained as distances along the Z-axis direction.

16. An apparatus for perspective transformation of a plurality of objects in three-dimensional space on a virtual two-dimensional screen, each of the objects being specified by a plurality of points, the apparatus comprising a graphics unit operable to use respective coordinate values of a typical point of each of the plurality of points in performing an approximate perspective transformation of each of the plurality of points of the objects, wherein the graphics unit is further operable to determine whether each plurality of points is localized with respect to a point of view in the three-dimensional space.

17. An apparatus according to claim 16, wherein:

distances from the point of view to the plurality of points are represent by Z values, a minimum Z value of an ith object (i=1, 2, . . . , M) is minZi, a maximum Z value—of the ith object is maxZi, an average of the Z values of the ith object is meanZi; and the graphics unit determines that each plurality of points is localized when the following expressions are satisfied:

$$|minZ1-maxZ1|+|meanZ1-meanZ2 \cdot K2,$$

$$|minZ2-maxZ2|+|meanZ1-meanZ2 \cdot K2,$$

$$|minZ2-maxZ2|+|meanZ2-meanZ3 \cdot K2,$$

$$|minZ3-maxZ3|+|meanZ2-meanZ3 \cdot K2,$$

$$|minZM-1-maxZM-1|+|meanZM-1-meanZM| \cdot K2, \text{ and}$$

$$|minZM-maxZM|+|meanZM-1-meanZM| \cdot K2$$

where K2 is a scalar.

18. An apparatus according to claim 17, wherein K2 is smaller than 1.0.

19. An apparatus according to claim 17, wherein K2 varies depending on an application program.

20. An apparatus according to claim 17, wherein K2 varies depending on a graphics scene.

21. An apparatus according to claim 17, wherein the graphics unit is operable to selectively apply an approximation of the perspective transformation to the object satisfying the expressions.

22. The apparatus according to claim 16, wherein the graphics unit is operable to determine whether the plurality of points are localized in the three-dimensional space with respect to a direction along a line of sight extending from the point of view to the object.

23. An entertainment system, comprising:

a control system;

a graphics system;

a sound system;

an optical disk control unit; and a bus operably connecting the control system, the graphics system, the sound system and the optical disc control unit to each other, wherein:

the graphics system includes a geometry transfer engine operable to perform perspective transformation of an object in three-dimensional space on a virtual two-dimensional screen, the object being specified by a plurality of points, the geometry transfer engine being further operable to use coordinate values of a typical point of the plurality of points in performing an approximate perspective transformation of the plurality of points of the object; and the geometry transfer engine is further operable to determine whether the plurality of points are localized with respect to a point of view in the three-dimensional space.

24. An entertainment system, comprising:

a control system;

a graphics system;

a sound system;

an optical disk control unit; and a bus operably connecting the control system, the graphics system, the sound system and the optical disc control unit to each other, wherein:

the graphics system includes a geometry transfer engine operable to perform perspective transformation of a plurality of objects in three-dimensional space on a virtual two-dimensional screen, each object being specified by a plurality of points, the geometry transfer engine being further operable to use respective coordinate values of a typical point of each of the plurality of points in performing an approximate perspective transformation of each of the plurality of points of the objects; and the geometry transfer engine is further operable to determine whether each plurality of points is localized with respect to a point of view in the three-dimensional space.

25. A method of perspective transformation of an object in three-dimensional space, the object being specified by a plurality of points, the method comprising:

performing an approximate perspective transformation of the plurality of points of the object using coordinate values of a typical point of the plurality of points; and determining whether the plurality of points are localized with respect to a point of view in the three-dimensional space.

26. A method according to claim 25, wherein:

distances from the point of view to the plurality of points are represent by Z values, a minimum Z value of the object is minZ, a maximum Z value of the object is maxZ, an average of the Z values of the object is meanZ; and the graphics unit determines that the plurality of points are localized when the following expressions are satisfied:

$|minZ-maxZ|+|minZ| \cdot K1,$ $|minZ-maxZ|+|maxZ| \cdot K1,$ or $|minZ|maxZ|+|meanZ| \cdot K1$ where K1 is a scalar.

27. A method of performing perspective transformation of a plurality of objects in three-dimensional space, each of the objects being specified by a plurality of points, the method comprising:

performing an approximate perspective transformation of the plurality of points of the object using coordinate values of a typical point from each of the plurality of points of the objects; and determining whether each of the plurality of points is localized with respect to a point of view in the three-dimensional space.

28. A method according to claim 27, wherein:

distances from the point of view to the plurality of points are represent by Z values, a minimum Z value of an ith object (i)=$1, 2, \ldots, M$) is minZi, a maximum Z value of the ith object is maxZi, an average of the Z values of the ith object is meanZi; and the graphics unit determines that each plurality of points is localized when the following expressions are satisfied:

$|minZ1-maxZ1|+|meanZ1-meanZ2| \cdot K2,$ $|minZ2-maxZ2|+|meanZ1-meanZ2| \cdot K2,$ $|minZ2-maxZ2|+|meanZ2-meanZ3| \cdot K2,$ $|minZ3-maxZ3|+|meanZ2-meanZ3| \cdot K2,$ $|minZM-1-maxZM-1|+|meanZM-1-meanZM| \cdot K2,$ and $|minZM-maxZM|+|meanZM-1-meanZM| \cdot K2$ where K2 is a scalar.

29. A recording medium which stores a program capable of causing a system to perform perspective transformation of an object in a three-dimensional space, the object being specified by a plurality of points, the program at causing the system to perform the steps comprising:

performing an approximate perspective transformation of the plurality of points of the object using coordinate values of a typical point of the plurality of points; and determining whether the plurality of points are localized with respect to a point of view in the three-dimensional space.

30. A recording medium which stores a program capable of causing a system to perform perspective transformation of a plurality of objects in a three-dimensional space, each object being specified by a plurality of points, the program causing the system to perform the steps comprising:

performing an approximate perspective transformation of the plurality of points of the object using coordinate values of a typical point of each of the plurality of points of the objects; and determining whether each of the plurality of points is localized with respect to a point of view in the three-dimensional space.

* * * * *

UNITED STATES PATENT AND TRADEMARK OFFICE
CERTIFICATE OF CORRECTION

PATENT NO. : 6,590,576 B1
DATED : July 8, 2003
INVENTOR(S) : Oka Masaaki

It is certified that error appears in the above-identified patent and that said Letters Patent is hereby corrected as shown below:

Column 2,
Line 7, "|minZ| · K1," should read -- |minZ| $\leq$ K1, --.
Line 9, "|maxZ| · K1, or" should read -- |maxZ| $\leq$ K1, or --.
Line 11, "|meanZ| · K1" should read -- |meanZ| $\leq$ K1 --.
Lines 28 and 30, "meanZ2| · K2," should read -- meanZ2| $\leq$ K2, --.
Lines 32 and 34, "meanZ3| · K2," should read -- meanZ3| $\leq$ K2, --.
Line 36, "meanZM| · K2, and" should read -- meanZM| $\leq$ K2, and --.
Line 38, "meanZM| · K2," should read -- meanZM| $\leq$ K2, --.

Column 9,
Line 60, "maxZ| · |minZ|" should read -- maxZ| $\leq$ |minZ| --.
Line 62, "maxZ| · |maxZ|" should read -- maxZ| $\leq$ |maxZ| --.
Line 64, "maxZ| · |meanZ|" should read -- maxZ| $\leq$ |meanZ| --.

Column 11,
Line 8, "maxZ| · |minZ|" should read -- maxZ| $\leq$ |minZ| --.
Line 10, "maxZ| · |maxZ|" should read -- maxZ| $\leq$ |maxZ| --.
Line 12, "maxZ| · |meanZ|" should read -- maxZ| $\leq$ |meamZ| --.
Line 44, "maxZ1| · |meanZ1" should read -- maxZ1| $\leq$ |meanZ1 --.
Line 46, "maxZ2| · |meanZ1" should read -- maxZ2| $\leq$ |meanZ1 --.
Line 48, "maxZ2| · |meanZ2" should read -- maxZ2| $\leq$ |meanZ2 --.
Line 50, "maxZ3| · |meanZ2" should read -- maxZ3| $\leq$ |meanZ2 --.
Line 52, "maxZM-1| · |meanZM-1" should read -- maxZM-1| $\leq$ |meanZM-1 --.
Line 54, "maxZM| · |meanZM-1" should read -- maxZM| $\leq$ |meanZM-1 --.

Column 13,
Lines 26 and 61, "|minZ| · K1" should read -- |minZ| $\leq$ K1 --.
Lines 28 and 63, "|maxZ| · K1" should read -- |maxZ| $\leq$ K1 --.
Lines 29 and 65, "|meanZ| · K1" should read -- |meanZ| $\leq$ K1 --.

Column 14,
Lines 7 and 9, "meanZ2| · K2" should read -- meanZ2| $\leq$ K2 --.
Lines 11 and 13, "meanZ3| · K2" should read -- meanZ3| $\leq$ K2 --.
Line 15, "meanZM| · K2 and" should read -- meanZM| $\leq$ K2 --.
Line 15, "meanZM| · K2" should read -- meanZM| $\leq$ K2 --.

Column 17,
Line 45, "Z| + |minZ| · K1," should read -- Z| + |minZ| $\leq$ K1, --.
Line 47, "Z| + |maxZ| · K1, or" should read -- Z| + |maxZ| $\leq$ K1, or --.
Line 49, "Z| + |meanZ| · K1" should read -- Z| + |meanZ| $\leq$ K1 --.

UNITED STATES PATENT AND TRADEMARK OFFICE
CERTIFICATE OF CORRECTION

PATENT NO. : 6,590,576 B1
DATED : July 8, 2003
INVENTOR(S) : Oka Masaaki

It is certified that error appears in the above-identified patent and that said Letters Patent is hereby corrected as shown below:

Column 18,
Line 20, "Z1| + |meanZ1-meanZ2 · K2," should read
-- Z1| + |meanZ1-meanZ2| ≤ K2, --.
Line 22, "Z2| + |meanZ1-meanZ2 · K2," should read
-- Z2| + |meanZ1-meanZ2| ≤ K2, --.
Line 24, "Z2| + |meanZ2-meanZ3 · K2," should read
-- Z2| + |meanZ2-meanZ3| ≤ K2, --.
Line 26, "Z3| + |meanZ2-meanZ3 · K2," should read
-- Z3| + |meanZ2-meanZ3| ≤ K2, --.
Line 28, "ZM-1| + |meanZM-1-meanZM| · K2, and" should read
-- ZM-1| + |meanZM-1-meanZM| ≤ K2, and --.
Line 30, "ZM| + |meanZM-1-meanZM| · K2" should read
-- ZM| + |meanZM-1-meanZM| ≤ K2 --.

Column 19,
Line 25, after "specified", delete ".".
Line 43, "Z| + |minZ| · K1," should read -- Z| + |minZ| ≤ K1, --.
Line 45, "Z| + |maxZ| · K1, or" should read -- Z| + |maxZ| ≤ K1, or --.
Line 47, "Z| + |meanZ| · K1" should read -- Z| + |meanZ| ≤ K1 --.

Column 20,
Line 16, "Z1| + |meanZ1-meanZ2| · K2," should read
-- Z1| + |meanZ1-meanZ2| ≤ K2, --.
Line 18, "Z2| + |meanZ1-meanZ2| · K2," should read
-- Z2| + |meanZ1-meanZ2| ≤ K2, --.
Line 20, "Z2| + |meanZ2-meanZ3| · K2," should read
-- Z2| + |meanZ2-meanZ3| ≤ K2, --.
Line 22, "Z3| + |meanZ2-meanZ3| · K2," should read
-- Z3| + |meanZ2-meanZ3| ≤ K2, --.
Line 24, "ZM-1| + |meanZM-1-meanZM| · K2, and" should read
-- ZM-1| + |meanZM-1-meanZM| ≤ K2, and --.
Line 26, "ZM| + |meanZM-1-meanZM| · K2" should read
-- ZM| + |meanZM-1-meanZM| ≤ K2 --.

UNITED STATES PATENT AND TRADEMARK OFFICE
CERTIFICATE OF CORRECTION

PATENT NO.    : 6,590,576 B1
DATED         : July 8, 2003
INVENTOR(S)   : Oka Masaaki It is certified that error appears in the above-identified patent and that said Letters Patent is hereby corrected as shown below:

Column 20 (cont'd),
Line 32, after "program", delete "at".

Signed and Sealed this

Sixteenth Day of December, 2003

JAMES E. ROGAN
*Director of the United States Patent and Trademark Office*